July 1, 1969  J. T. WATTERS  3,452,883
MATERIAL HANDLING DEVICE

Filed Oct. 18, 1965  Sheet 1 of 3

INVENTOR
JOHNNY T. WATTERS
BY
ATTORNEY

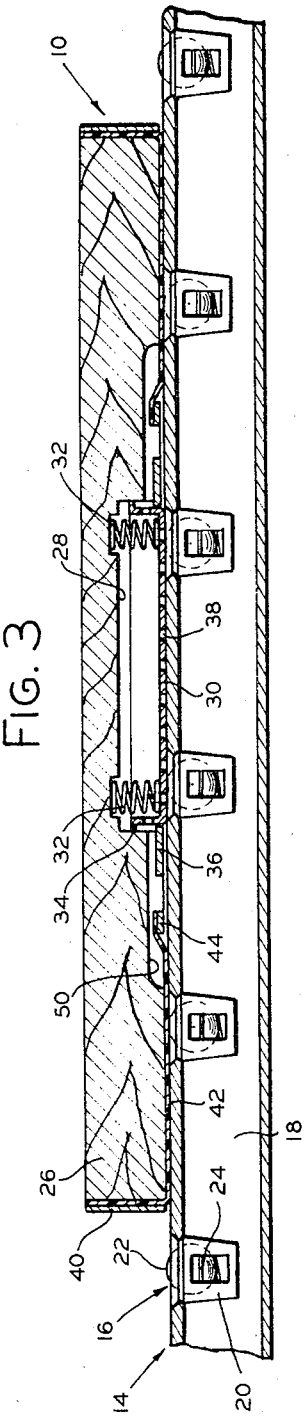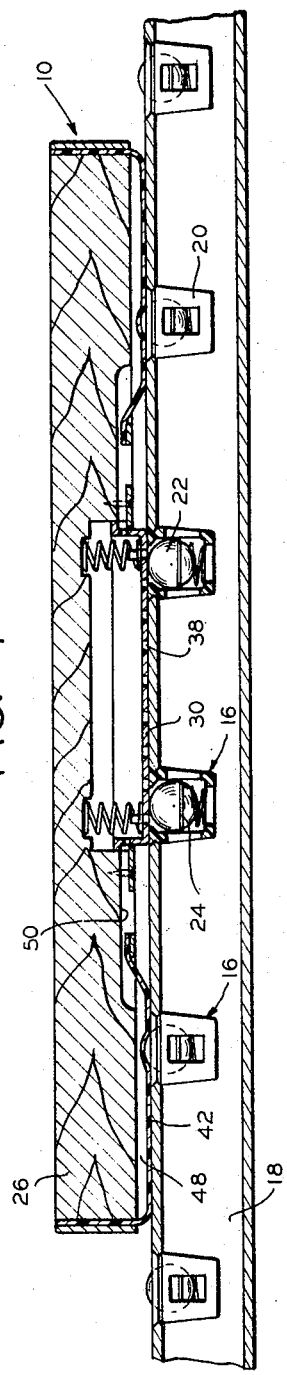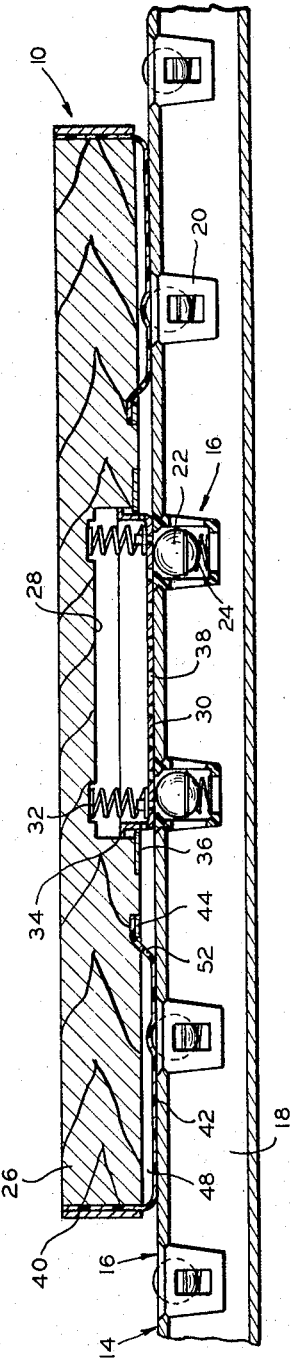

United States Patent Office 3,452,883
Patented July 1, 1969

3,452,883
MATERIAL HANDLING DEVICE
Johnny T. Watters, Battle Creek, Mich., assignor to Clark Equipment Company, a corporation of Michigan
Filed Oct. 18, 1965, Ser. No. 496,927
Int. Cl. B65d 19/38
U.S. Cl. 214—1
11 Claims

ABSTRACT OF THE DISCLOSURE

An air film material handling device for use with an air-in-floor material handling system. The device includes an inflatable air chamber and a depressor plate for actuating the air valves associated with the system when the air chamber is inflated.

---

Air-in-floor material handling systems include floors provided with a plurality of ball check type valves disposed in a pattern therein. The valves are operable when a pallet is located over them to direct pressurized air between the pallet and floor, whereby the pallet and any load disposed thereupon may be slid omnidirectionally over the floor with very little effort since the air film greatly reduces the coefficient of friction between the floor and pallet. U.S. Patent No. 2,918,183 which issued on Dec. 22, 1959, in the names of T. K. Peterson and P. L. Smith discloses an air-in-floor type material handling system which utilizes pallets having a resilient cellular material covered by a flexible skin on the underside thereof. Such pallets are inefficient from the standpoint that they require a relatively great flow of air under rather high pressure in order to function properly. On the other hand, U.S. Patent No. 3,161,247 which issued on Dec. 15, 1964, in the name of H. A. Mackie discloses a pallet which includes an annular inflatable air chamber on the underside thereof. Such a pallet is a great deal more efficient than the type of pallet described in the aforementioned Peterson patent from the standpoint of air flow and pressure, but is not suitable for use with an air-in-floor type system because it will not actuate the valves in the floor. Therefore, it is a principal object of my invention to provide an air pallet which is suitable for use with an air-in-floor type material handling system and has a greatly improved efficiency from the standpoint of air flow and pressure required for operation.

Another object of my invention is to provide an improved pallet for use with an air-in-floor type material handling system.

In carrying out my invention in a preferred embodiment thereof, I provide a flexible sheet and a depressor plate attached to the underside of a platform. The sheet forms with the platform an inflatable air chamber and the depressor plate is biased resiliently outwardly from the platform underside and located centrally of the air chamber. The air chamber is inflated by means of pressurized air which is directed to the interior of the air chamber through air passages in the platform which communicate with the atmosphere adjacent the depressor plate.

In another embodiment of my invention, the air chamber is inflated by means of pressurized air which is supplied thereto through openings in the flexible sheet adjacent the inner periphery thereof.

Figure 1:
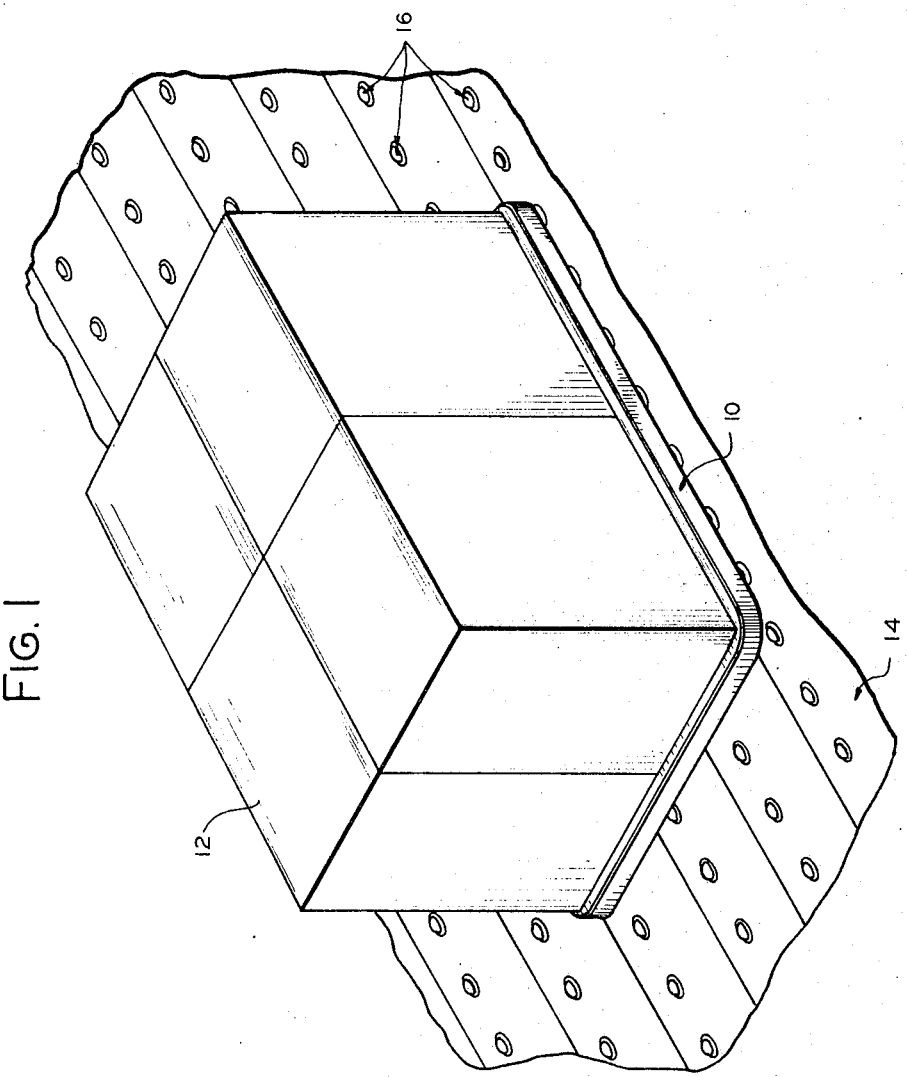
Figure 2:
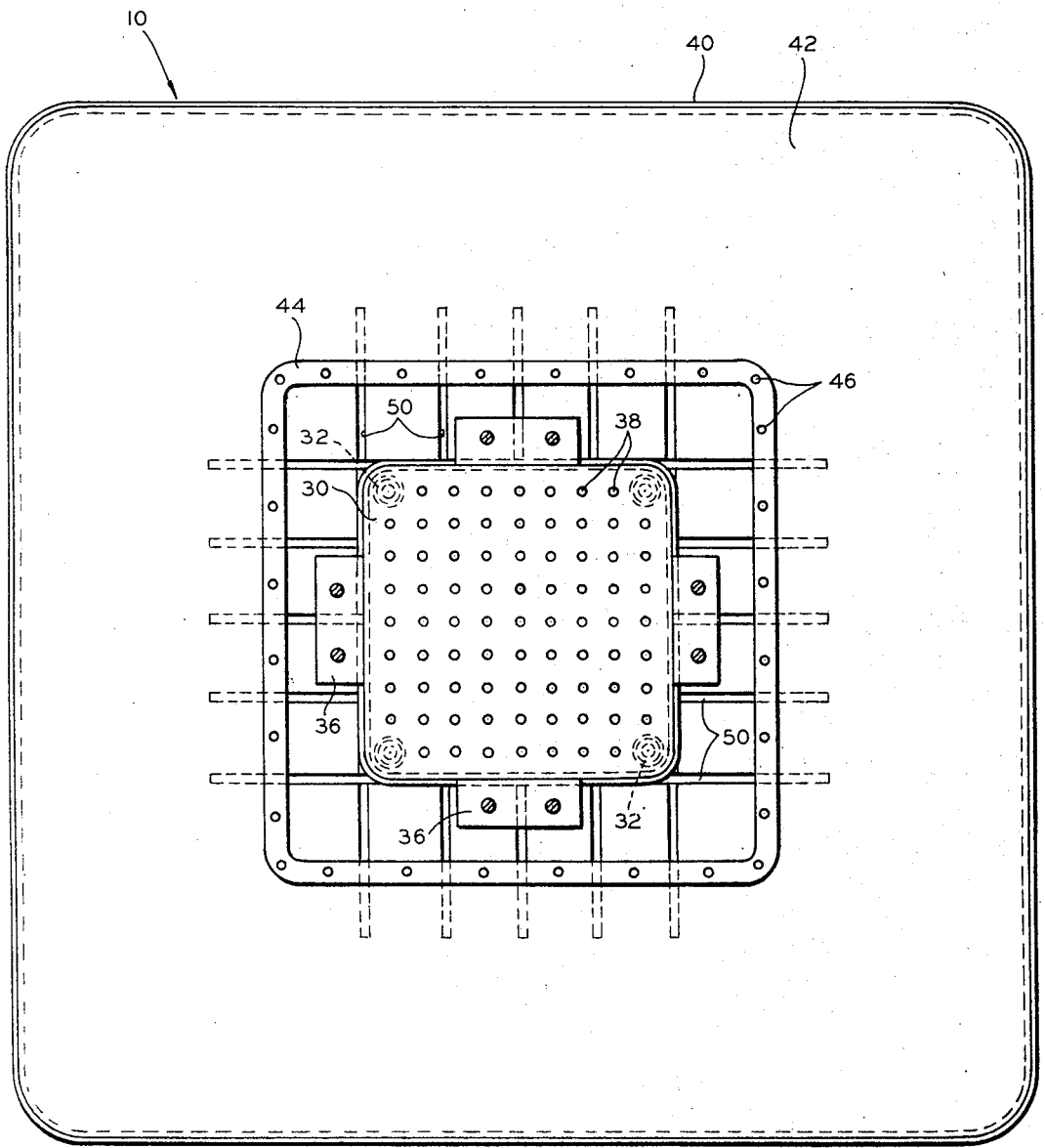

The above and other objects, features and advantages of my invention will become more readily apparent to one skilled in the art form the following detailed description taken in conjunction with the accompanying drawing wherein:

FIGURE 1 shows my invention being used to support a load upon a floor in which a plurality of air valves are located, FIGURE 2 is a view of the underside of the pallet shown in FIG. 1, FIGURE 3 is a cross-section of the pallet with the air chamber on the underside of the pallet deflated, FIGURE 4 is similar to FIG. 3, except that the air chamber is inflated, and FIGURE 5 shows a modification of my invention.

Referring to FIG. 1, the reference numeral 10 denotes generally a pallet which is carrying a load 12 and is supported upon a floor 14 in the upper surface of which a plurality of air valves 16 is located.

Referring for the moment to FIGS. 3, 4 and 5, the floor 14, it will be noted, is hollow, thereby defining a plenum chamber 18 into which air valves 16 extend. Each air valve 16 includes a molded nylon cage member 20 which is designed to snap into place in an opening in the surface of floor 14. Disposed in cage 20 is a stainless steel ball 22 which is biased upwardly by a compression spring 24. Ball 22 cooperates with cage 20 so that air flow through valve 14 is prevented unless ball 22 is depressed.

A preferred embodiment of pallet 10 is shown in FIGS. 2, 3 and 4 and includes a rigid platform 26 which may be a sheet of plywood, for example, and is adapted to carry a load on the upper side thereof. Platform 26 is generally square in plan view; however, such shape is not critical and it could be elongated in one direction, oval or circular, for example. Located in the underside of platform 26 centrally thereof is a recess 28 which serves to receive a depressor plate 30 for reciprocal movement therein. Disposed between the bottom of recess 28 and depressor plate 30 are four compression springs 32 which are located adjacent the corners of depressor plate 30 and serve to bias depressor plate 30 in a direction outwardly of recess 28. Depressor plate 30 is provided with a flange 34 around the edge thereof which cooperates with four brackets 36 connected to the underside of platform 26 so that depressor plate 30 is connected to platform 26 but may move inwardly and outwardly in recess 28. Also, it will be noted that depressor plate 30 is provided with a plurality of openings 38 therein, the purpose of which will become apparent shortly.

Connected to the edges or outer periphery of platform 26 by means of a strap 40, for example, is a flexible sheet 42 which is fastened to the underside of platform 26 outwardly of depressor plate 30 by means of a recessed ring 44 which is connected to platform 26 by a plurality of suitable fasteners, such as screws 46. I have found that urethane sheeting having a thickness of .030 of an inch is a satisfactory material for sheet 42. Sheet 42 is connected to the edges and underside of platform 26 with some slackness so that it may be inflated by supplying pressurized air to the air chamber 48 (FIG. 4) formed between platform 26 and sheet 42 and function to throttle the flow of air out from between sheet 42 and the floor.

A plurality of slots 50 are cut in the underside of platform 26 and extend outwardly from recess 28 to points outwardly of the connection of sheet 42 to the underside of platform 26. These slots or grooves 50 provide air passages which connect air chamber 48 with recess 28 and with the atmosphere adjacent recess 28.

In order to enable persons skilled in the art to better understand my invention, I will now explain the operation of it. It will be assumed that a pallet 10 carrying a load on the upper side thereof is disposed upon a floor 14, and further that no pressurized air is being supplied to plenum chamber 18 in the floor. Consequently, the pallet will be disposed as shown in FIG. 3, the balls 22 of the valves 16 located under the pallet being depressed due to the weight of the pallet and load upon them. Now, it will be assumed that pressurized air is supplied to plenum chamber 18. As a result pressurized air flows outwardly through valves 16 and through slots 50 into air chamber 48, thereby inflating sheet 42 so that a portion of it tends to conform closely to the contours of floor 14. It will be noted that initially some of the air flow is from the valves 16 through openings 38 in plate 30 into recess 28 and hence to chamber 48 via grooves 50 so that inflation of air chamber 48 is assured. Pressurized air also flows outwardly from under pallet 10 in all directions so that there is a film of air between floor 14 and sheet 42. Also, it will be noted from FIG. 4 that platform 26 is elevated slightly with the result that the balls in valves 16 which are located outwardly of depressor plate 30 are no longer depressed. The air flow is maintained through the valves 16, the balls of which are depressed by depressor plate 30, the combined loading of springs 32 being sufficient to overcome the combined loading of springs 24 of the largest number of valves 16 which could be located under depressor plate 30 at any one time.

At this point it will be appreciated that I have disclosed a pallet having an inflatable member on the underside thereof and which may be used in conjunction with a floor having a plurality of ball check valves in the surface thereof by virtue of a depressor plate 30 which is resiliently biased into contact with the ball check valves.

In another embodiment of my invention which is shown in FIG. 5, the grooves 50 in the underside of platform 26 are eliminated and instead sheet 42 is provided with a plurality of openings 52 therein which communicate air chamber 48 with the atmosphere adjacent depressor plate 30.

Although only two embodiments of my invention have been described herein, this disclosure is merely for the purpose of illustration and not as a limitation on the scope of the invention. It is therefore to be expressly understood that the invention is not limited to the embodiments shown, but may be used in various other ways, and that various modifications may be made to suit different requirements, and that other changes, substitutions, additions and omissions may be made in the construction, arrangement and manner of operation of the parts without necessarily departing from the scope of the invention as defined in the following claims.

I claim:

1. For use with an air-in-floor material handling system including a floor and a plurality of air valves located in the floor, a pallet comprising a platform, inflatable air flow throttling means connected to the said platform and means connected to the said platform for operating the air valves when the said throttling means is inflated.

2. A pallet comprising a platform, a depressor plate connected to the said platform for reciprocal movement relative thereto and located centrally of the underside of the said platform, spring means for biasing the said plate away from the underside of the said platform, a flexible sheet connected to the said platform so that the said sheet forms with the said platform underside an inflatable fluid chamber, and fluid passage means connecting the said fluid chamber with the atmosphere.

3. A pallet as set forth in claim 2 wherein the said fluid passage means includes at least one groove in the said platform for connecting the said fluid chamber with the atmosphere adjacent the said plate.

4. A pallet as set forth in claim 2 wherein the said fluid passage means includes at least one opening in the said sheet for connecting the said fluid chamber with the atmosphere adjacent the said plate.

5. An air film load carrying device comprising a platform, a recess in the underside of the said platform, a flexible sheet connected to the said platform at the outer periphery thereof and intermediate the said recess and the said outer periphery and defining with the said platform underside a chamber adapted to be filled with a fluid, a depressor plate disposed in the said recess and connected to the said platform for inward and outward movement relative to the said recess, spring means which engage the said depressor plate and tend to bias the said plate outwardly, and fluid passage means connecting the said chamber with the atmosphere adjacent the said plate.

6. A device as set forth in claim 5 wherein the said fluid passage means includes at least one groove in the said platform which connects the said recess with the said chamber.

7. A device as set forth in claim 5 wherein the said fluid passage means includes an opening in the said sheet for connecting the said chamber with the atmosphere adjacent the said plate.

8. A load carrying device comprising a platform having a bottom, a flexible sheet connected to the said platform bottom and defining therewith a chamber adapted to be filled with a fluid, a depressor plate slidably connected to the said platform bottom substantially centrally thereof, spring means disposed between the said platform and the said depressor plate for biasing the said plate in a direction away from the said platform, and fluid passage means connecting the said chamber with the atmosphere adjacent the said depressor plate.

9. For use with an air-in-floor material handling system, a pallet comprising a platform, a recess in the underside of the said platform which is located substantially centrally of the said platform, a depressor plate disposed in the said recess for reciprocal sliding movement, the said plate including at least one opening therein, means connected to the said platform and engageable by the said plate for retaining the said plate in the said recess, means disposed between the said plate and the bottom of the said recess for resiliently biasing the said plate in a direction outwardly of the said recess, a flexible sheet connected to the outer perimeter of the said platform and to the said platform intermediate the said outer perimeter and the said recess to form with the said platform an inflatable air chamber, and at least one groove in the said platform underside which extends from the said recess to a point intermediate the connections of the said sheet to the said platform.

10. A pallet comprising a platform, a recess in the underside of the said platform which is located substantially centrally of the said platform, a depressor plate disposed in the said recess with reciprocal sliding movement, the said plate including at least one opening therein, means connected to the said platform and engageable by the said plate for retaining the said plate in the said recess, means disposed between the said plate and the bottom of the said recess for resiliently biasing the said plate in a direction outwardly of the said recess, a flexible sheet connected to the said platform and forming therewith an inflatable air chamber surrounding the said recess, and at least one groove in the said platform which connects the said air chamber with the said recess.

11. A pallet comprising a platform, a recess in the underside of the said platform which is located substantially centrally of the said platform, a depressor plate disposed in the said recess with reciprocal sliding movement, the said plate including at least one opening therein, means connected to the said platform and engageable by the said plate for retaining the said plate in the said recess, means disposed between the said plate and the bottom of the said recess for resiliently biasing the said plate in a direction outwardly of the said recess, a flexible sheet connected to the said platform and forming therewith an inflatable air chamber surrounding the said recess, and at least one opening in the said sheet which connects the said air chamber with the atmosphere adjacent the said recess.

References Cited

UNITED STATES PATENTS 2,918,183 12/1959 Petersen _____ 214—1
3,313,367 4/1967 Swedburg _____ 180—7

GERALD M. FORLENZA, *Primary Examiner.*
GEORGE F. ABRAHAM, *Assistant Examiner.*

U.S. Cl. X.R.

302—29